United States Patent
Dunn et al.

(10) Patent No.: US 11,433,996 B2
(45) Date of Patent: Sep. 6, 2022

(54) LIGHTWEIGHT LOW DRAG ROTOR PITCH BEAM

(71) Applicant: LOCKHEED MARTIN CORPORATION, Bethesda, MD (US)

(72) Inventors: Eric Dunn, Trumbull, CT (US); Joseph Nathan Hull, Azle, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 192 days.

(21) Appl. No.: 16/747,199

(22) Filed: Jan. 20, 2020

(65) Prior Publication Data

US 2021/0221497 A1 Jul. 22, 2021

(51) Int. Cl.
*B64C 27/59* (2006.01)
*B64C 27/78* (2006.01)
*B64C 27/82* (2006.01)

(52) U.S. Cl.
CPC .............. *B64C 27/59* (2013.01); *B64C 27/78* (2013.01); *B64C 27/82* (2013.01)

(58) Field of Classification Search
CPC ......... B64C 11/32; B64C 11/36; B64C 27/59; B64C 27/82; B64C 27/78; B64C 2027/8236
See application file for complete search history.

(56) References Cited

U.S. PATENT DOCUMENTS

| 5,415,525 | A | 5/1995 | Desjardins et al. | |
|---|---|---|---|---|
| 5,542,818 | A | 8/1996 | Monvaillier et al. | |
| 5,738,494 | A | 4/1998 | Schmaling | |
| 8,506,257 | B2 * | 8/2013 | Bottome ................ | F01D 5/148 416/224 |
| 2009/0159740 | A1 * | 6/2009 | Brody .................... | B64C 27/10 244/17.21 |
| 2018/0244368 | A1 * | 8/2018 | Vogl ...................... | B64C 11/32 |

FOREIGN PATENT DOCUMENTS

| EP | 3228541 A1 * | 10/2017 | ............ B64F 5/60 |
|---|---|---|---|
| FR | 2684351 A1 * | 6/1993 | ............ B64C 27/82 |

* cited by examiner

*Primary Examiner* — Richard A Edgar
(74) *Attorney, Agent, or Firm* — Foley & Lardner LLP

(57) ABSTRACT

A pitch beam movable by a pitch change shaft to adjust a pitch of at least one rotor blade of a rotor system via a pitch linkage includes a first surface having a generally planar configuration, a smooth second surface disposed opposite the first surface, and a sidewall extending between the first surface and the second surface. A pitch linkage connection point is disposed at the sidewall to which the pitch linkage is attachable. An interior is defined between the first surface and the second surface and an opening extends through the first and second surface at a rotational axis of the rotor system to which the pitch change shaft is attached. Movement of the pitch change shaft moves the pitch beam and adjusts the pitch of the at least one rotor blade via the pitch linkage attached at the pitch linkage connection point.

19 Claims, 5 Drawing Sheets

SECTION B-B

LIGHTWEIGHT LOW DRAG ROTOR PITCH BEAM

STATEMENT REGARDING FEDERALLY SPONSORED RESEARCH OR DEVELOPMENT

This invention was made with Government support under H92236-17-C-0002 awarded by the United States Army. The Government has certain rights in this invention.

BACKGROUND

The subject matter disclosed herein relates to a rotor system for a rotary wing aircraft and, more particularly, to a pitch beam of a rotor system for a rotary wing aircraft.

Rotary wing aircrafts, such as helicopters for example, generally include a tail rotor configured to create aerodynamic thrust to compensate for the rotor torque generated by a main rotor. The tail rotor includes a tail rotor hub having multiple rotor blades mounted thereto. Arranged adjacent the tail rotor is a pitch control system including a pitch beam attached to an end of the pitch change shaft. The pitch beam has multiple arms, each of which is coupled to a corresponding tail rotor blade through a pitch linkage. A servo provides axial movement of the pitch change shaft relative to a tail rotor hub, thereby manipulating the rotational displacement of the rotor blades. Because the pitch beam has a number of arms equal to the total number of tail rotor blades, a custom pitch beam must be designed for each tail rotor system based on the number of tail rotor blades in the system. In addition, the size, weight, and complexity of the pitch beam increases substantially for tail rotor systems having a large number of tail rotor blades.

BRIEF DESCRIPTION

According to an embodiment, a pitch beam movable by a pitch change shaft to adjust a pitch of at least one rotor blade of a rotor system via a pitch linkage includes a first surface having a generally planar configuration, a smooth second surface disposed opposite the first surface, and a sidewall extending between the first surface and the second surface. A pitch linkage connection point is disposed at the sidewall to which the pitch linkage is attachable. An interior is defined between the first surface and the second surface and an opening extends through the first and second surface at a rotational axis of the rotor system to which the pitch change shaft is attached. Movement of the pitch change shaft moves the pitch beam and adjusts the pitch of the at least one rotor blade via the pitch linkage attached at the pitch linkage connection point.

In addition to one or more of the features described above, or as an alternative, in further embodiments the pitch beam is formed from a composite material.

In addition to one or more of the features described above, or as an alternative, in further embodiments the interior of the pitch beam includes a filler material and the first and second surface each comprise a composite material.

In addition to one or more of the features described above, or as an alternative, in further embodiments the sidewall is defined by an end portion of the second surface.

In addition to one or more of the features described above, or as an alternative, in further embodiments the first surface, the second surface, and the sidewall are integrally formed.

In addition to one or more of the features described above, or as an alternative, in further embodiments the second surface has a generally arcuate contour such that the pitch beam has a dome-like shape.

In addition to one or more of the features described above, or as an alternative, in further embodiments the interior includes one or more hollow areas.

In addition to one or more of the features described above, or as an alternative, in further embodiments the pitch linkage connection comprises at least one linkage opening formed in the interior for receiving the pitch linkage, the at least one linkage opening being positioned adjacent the sidewall.

In addition to one or more of the features described above, or as an alternative, in further embodiments the pitch beam is configured as a fairing for the rotor system.

According to another embodiment, a tail rotor system includes a tail rotor hub rotatable about an axis, at least one tail rotor blade extending from the tail rotor hub, and a pitch control. The pitch control includes a pitch change shaft extending from the tail rotor hub along the axis. The pitch change shaft is translatable along the axis relative to the tail rotor hub. A pitch beam is disposed at a distal end of the pitch change shaft and is coupled to the at least one tail rotor blade. The pitch beam is movable to adjust a pitch of the at least one tail rotor blade. An outwardly facing surface of the pitch beam facing away from the at least one tail rotor blade is a smooth surface.

In addition to one or more of the features described above, or as an alternative, in further embodiments the tail rotor system is arranged at a side of an extending tail of an aircraft.

In addition to one or more of the features described above, or as an alternative, in further embodiments the tail rotor system is a propulsor of an aircraft.

In addition to one or more of the features described above, or as an alternative, in further embodiments the pitch beam further comprises a first surface having a generally planar configuration, a smooth second surface disposed opposite the first surface, a sidewall extending between the first surface and the second surface, a pitch linkage connection point disposed at the sidewall to which the pitch linkage is attachable, an interior defined between the first surface and the second surface, and an opening extending through the first and second surfaces and the interior at a rotational axis of the rotor system to which the pitch change shaft is attached. Movement of the pitch change shaft moves the pitch beam and adjusts the pitch of the at least one rotor blade via the pitch linkage attached at the pitch linkage connection point.

In addition to one or more of the features described above, or as an alternative, in further embodiments the interior of the pitch beam includes a filler material and the first and second surface each comprise a composite material.

In addition to one or more of the features described above, or as an alternative, in further embodiments the outwardly facing surface of the pitch beam has a generally arcuate contour such that the pitch beam has a dome-like shape.

In addition to one or more of the features described above, or as an alternative, in further embodiments the pitch beam further comprises an inwardly facing surface disposed opposite the outwardly facing surface and facing the at least one tail rotor blade, a sidewall extending between the inwardly facing surface and the outwardly facing surface, and an interior defined between the inwardly facing surface and the outwardly facing surface.

In addition to one or more of the features described above, or as an alternative, in further embodiments the pitch beam further comprises at least one linkage opening formed in the interior and the pitch control system further comprises at least one pitch linkage associated with the at least one tail rotor blade, wherein a first end of the at least one pitch linkage is receivable within the at least one linkage opening.

In addition to one or more of the features described above, or as an alternative, in further embodiments the at least one linkage opening is positioned adjacent the sidewall.

In addition to one or more of the features described above, or as an alternative, in further embodiments the pitch beam is configured as a fairing for the rotor system.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
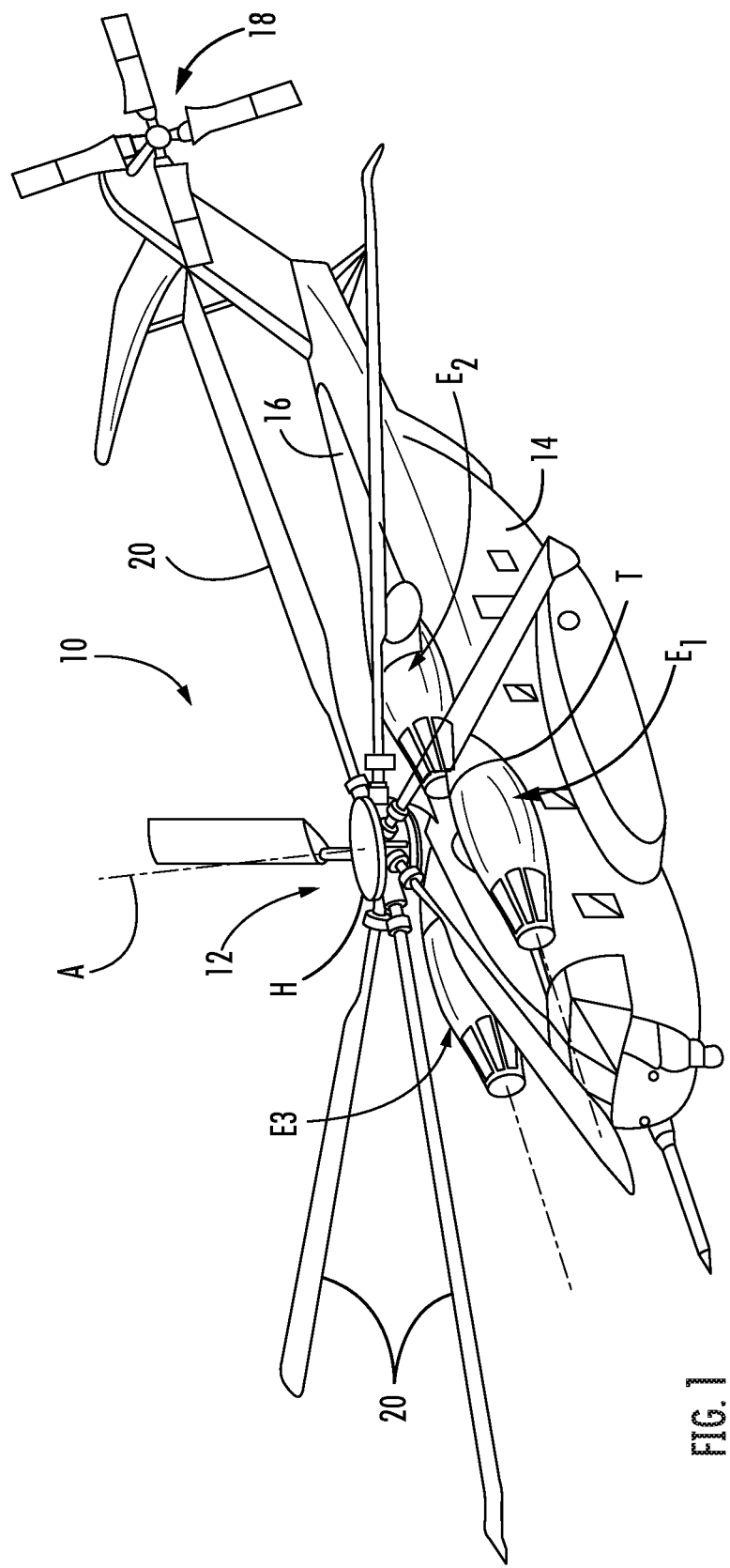
FIG. 1 is a perspective side view of an exemplary rotary-wing aircraft in accordance with embodiments.

Referring the FIG. 1, example of a vertical takeoff and landing (VTOL) rotary-wing aircraft 10 having a main rotor assembly 12, such as a helicopter for example, is illustrated. As shown, the aircraft 10 includes an airframe 14 having an extending tail 16 which mounts a tail rotor system 18, such as an anti-torque system. The main rotor assembly 12 is driven about an axis of rotation A via a main gearbox, illustrated schematically at T, by one or more engines, illustrated at E1-E3. The main rotor assembly 12 includes a plurality of rotor blade assemblies 20 mounted to a rotor hub assembly H. Although a particular helicopter configuration is illustrated and described in the disclosed non-limiting embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

Figure 2:
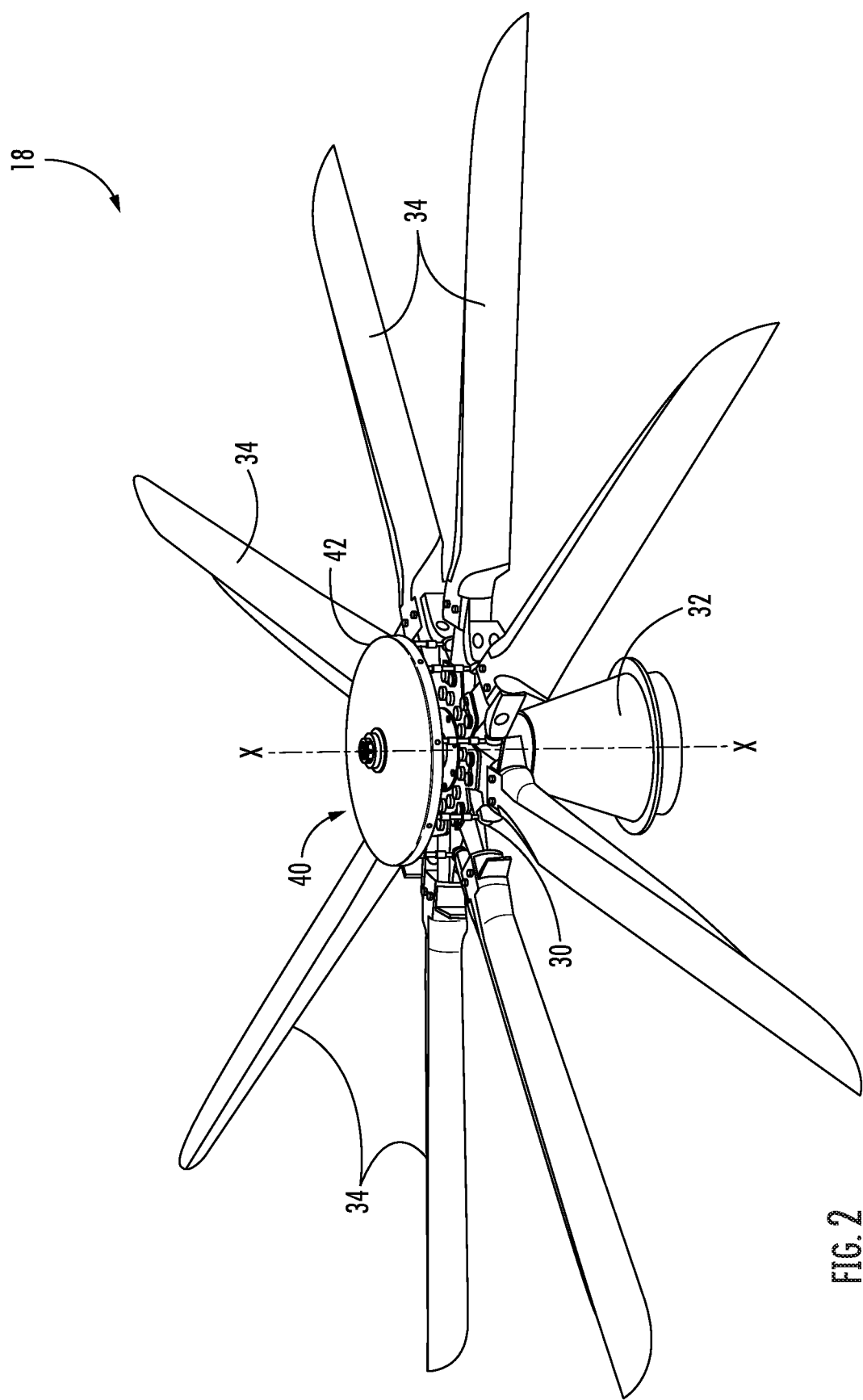
FIG. 2 is a perspective view of a rotor assembly according to an embodiment.
Figure 3:
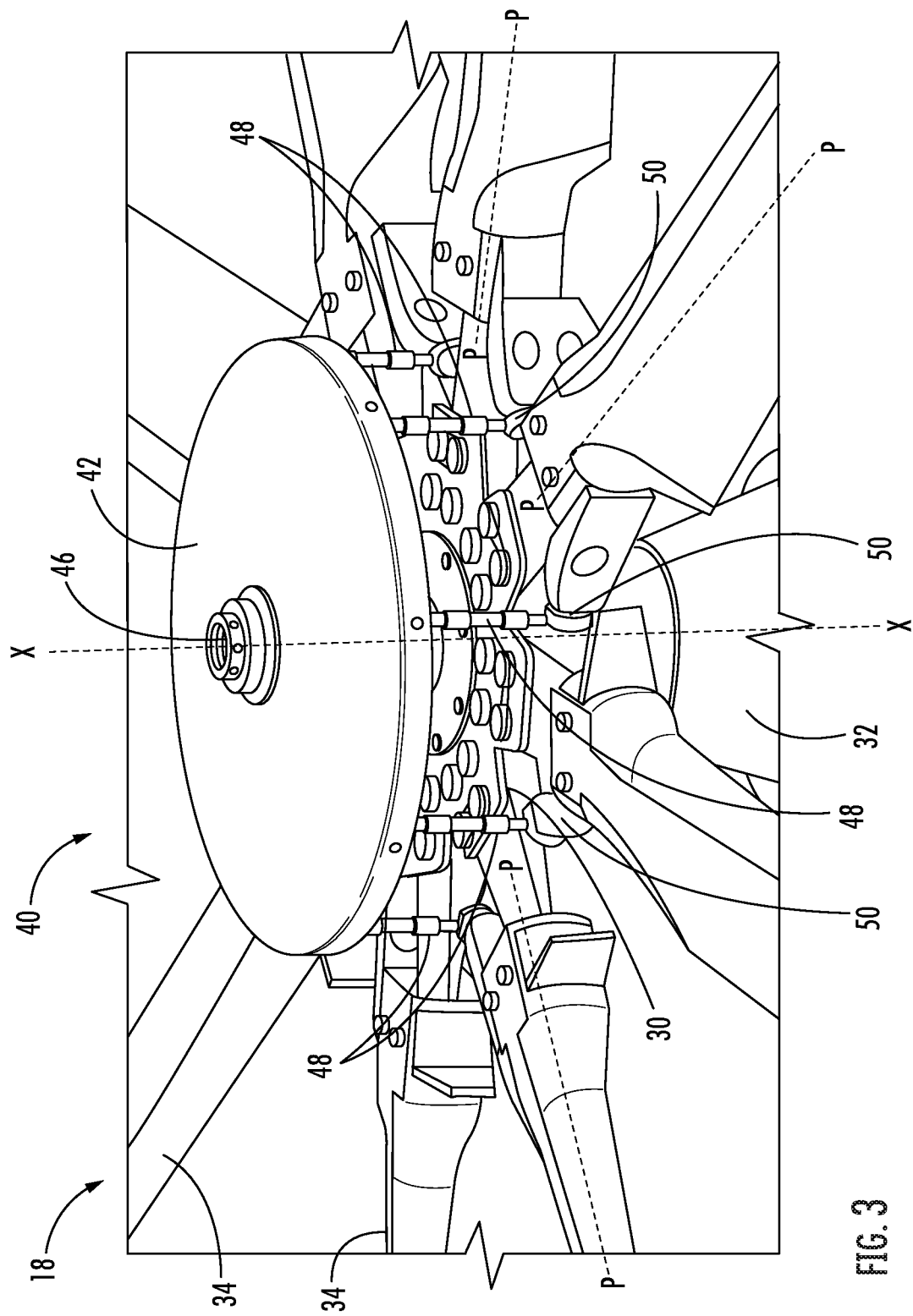
FIG. 3 is a detailed view of the rotor assembly of FIG. 2 according to an embodiment.

With reference now to FIGS. 2 and 3, an example of a portion of a tail rotor system 18 is illustrated in more detail. As shown, the tail rotor system 18 includes a tail rotor hub 30 configured to rotate about a rotational axis X of a first shaft 32. A plurality of tail rotor blades 34 are connected to the tail rotor hub 30 and extend generally radially outwardly therefrom.

Rotation of the main rotor assembly 12 about the main rotor axis A exerts a torque reaction on the airframe 14. Rotation of the tail rotor system 18 about the tail rotor axis X generates thrust, which opposes the torque reaction, thereby providing control of the aircraft 10 in flight. The magnitude of the thrust is controlled by a pitch control system 40. The pitch control system 40 is operable to collectively change the pitch of each of the plurality of tail rotor blades 34 in the tail rotor system 18. In embodiments where the aircraft 10 includes a coaxial main rotor assembly having little or no torque, the tail rotor system may include a propulsor operable to produce thrust to propel the aircraft.

With continued reference to FIGS. 2 and 3, an example of a pitch control system 40 for varying the pitch of each tail rotor blade 34 is illustrated. Arranged substantially parallel to the tail rotor hub 30 is a pitch beam 42. The pitch beam 42 is located at a distal end 46 of a pitch change shaft 44 (best shown in FIG. 5) such that a distance exists between the tail rotor hub 30 and the pitch beam 42. The pitch change shaft 44 is operable to translate along the rotational axis X to vary the distance between the tail rotor hub 30 and the pitch beam 42. In addition, the pitch change shaft 44 is generally configured to rotate with the tail rotor hub 30; however, in some embodiments, the pitch change shaft 44 may be selectively decoupled from the first shaft 32 to rotate the pitch beam 42 independently from the tail rotor hub 30 about axis X.

A plurality of pitch linkages 48 extending from the pitch beam 42 connect to a corresponding plurality of control horn arrangements 50 associated with the plurality of tail rotor blades 34. The pitch linkages 48 connect to the control horn arrangements 50 at a position offset from an axis defined by the control horn arrangement. As a result, axial displacement of the pitch beam 42, via translation of the pitch change shaft 44, applies a collective force to the plurality of tail rotor blades 34. This collective force causes the tail rotor blades 34 to twist about a respective pitch axis defined by the control horn arrangement 50, thereby changing the pitch of the tail rotor blades 34. A person having skill in the art will appreciate that changing the pitch of the tail rotor blades 34 changes the thrust generated by the tail rotor system 18.

In other pitch control systems, the pitch beam is a metal component having a plurality of radially outwardly extending arms equal in number to the total number of tail rotor blades 34. As the number of tail rotor blades 34 of the tail rotor system 18 increases, the increase in the weight and complexity of the pitch beam 42 is significant. With continued reference to FIGS. 2 and 3, and further reference to FIGS. 4-7, an aspect of the invention is that the pitch beam 42 is comparatively simplified. The pitch beam 42 generally includes a first surface 52, or inwardly facing surface, positionable closest to the airframe 14 and a second surface 54 configured to face outwardly away from the tail rotor system 18, towards the atmosphere and away from the airframe 14 along axis X. An axial through hole 56 is formed at a center of the pitch beam 42 for receiving the pitch change shaft 44. In an embodiment, the pitch beam 42 is rigidly mounted to the pitch change shaft 44 via a sleeve 58 and a retaining assembly 60, thereby preventing rotation of the pitch beam 42 relative to the pitch change shaft 44. The sleeve 58 may include a radial flange 62 configured to engage the first surface 52 of the pitch beam 42 and define a position of the pitch beam 42 relative to the pitch change shaft 44.

As shown, the first surface 52 of the pitch beam 42 may have a generally planar configuration, and the second surface 54 of the pitch beam 42 may have a smooth, generally arcuate contour, to form a structure having a disc-like or dome-like shape which is aerodynamic. However, it should be understood that a pitch beam 42 having another configuration, such as a planar second surface 54 for example, is also within the scope of the disclosure. A sidewall 64 extends between and connects the first surface 52 and the second surface 54. In an embodiment, the sidewall 64 is formed by an end portion of the second surface 54, which converges toward the first surface 52 of the pitch beam 42. Further, although the sidewall 64 is illustrated as being generally parallel to the axis X, embodiments where the sidewall 64 is angled relative to at least one of the first surface 52 and the second surface 54 are also contemplated herein. In an embodiment, the first surface 52 and the second surface 54, or alternatively, the first surface 52 and the sidewall 64, or alternatively, the second surface 54 and the sidewall 64, or alternatively, the first surface 52, the second surface 54, and the sidewall 64 are integrally formed.

In an embodiment, the shape or contour of the pitch beam 42, and more specifically of the second surface 54 and/or sidewall 64, is selected so that the pitch beam 42 functions like a fairing by reducing the drag across the pitch beam 42. In such embodiments, the sidewall 64 of the pitch beam 42 may extend beyond the first surface 52 to axially overlap at least a portion of the plurality of pitch linkages 48. In embodiments where a contour of the pitch beam 42 is selected to function as a fairing and reduce drag, the tail rotor system 18 need not include a separate rotor fairing.

Further, the pitch beam 42 may be formed from any suitable material, such as a composite material for example. In an embodiment, the pitch beam 42 may be a generally solid body. Alternatively, the pitch beam 42 may additionally include a distinct filler material, such as a honeycomb core for example, sandwiched between two or more layers of composite material. Embodiments including one or more hollow cavities, absent a filler material, formed between two or more layers of composite material are also contemplated herein.

Figure 5:
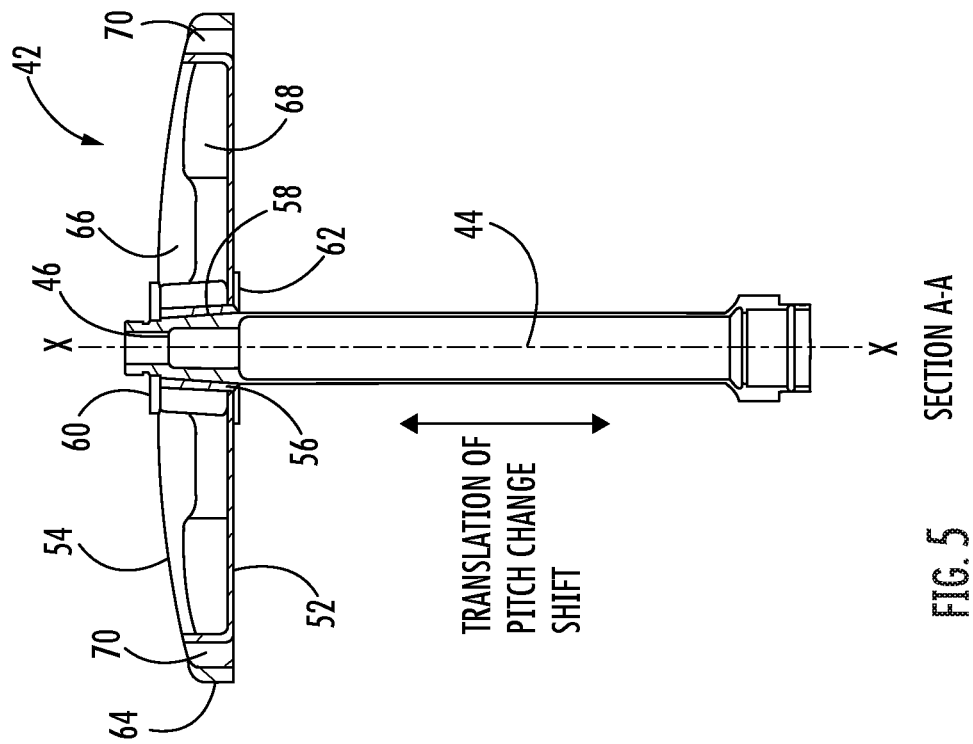
FIG. 5 is a cross-sectional view of FIG. 4 taken along line A-A according to an embodiment.
Figure 4:
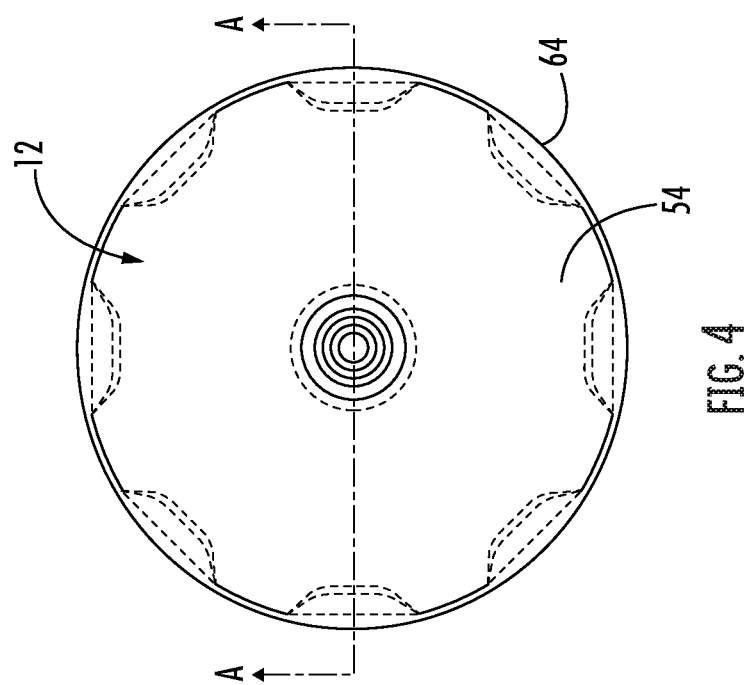
FIG. 4 is a plan view of a pitch beam of the rotor assembly of FIG. 2 according to an embodiment.

Additionally, as best shown in FIGS. 4 and 5, the pitch beam 42 includes an interior 66 extending between the first surface 52 and the second surface 54. The interior 66 may, but need not be uniform or axisymmetric. In an embodiment, one or more areas 68 of the interior 66 may be hollowed out to reduce the overall weight of the pitch beam 42. In an embodiment, best shown in FIGS. 5 and 7, one or more hollowed areas 68 extend outwardly from adjacent the sleeve 58 over at least a portion of the radius of the pitch beam 42, such as 50%, 60%, 65%, 70%, or 75% of the radius of the pitch beam 42 for example.

Figure 7:
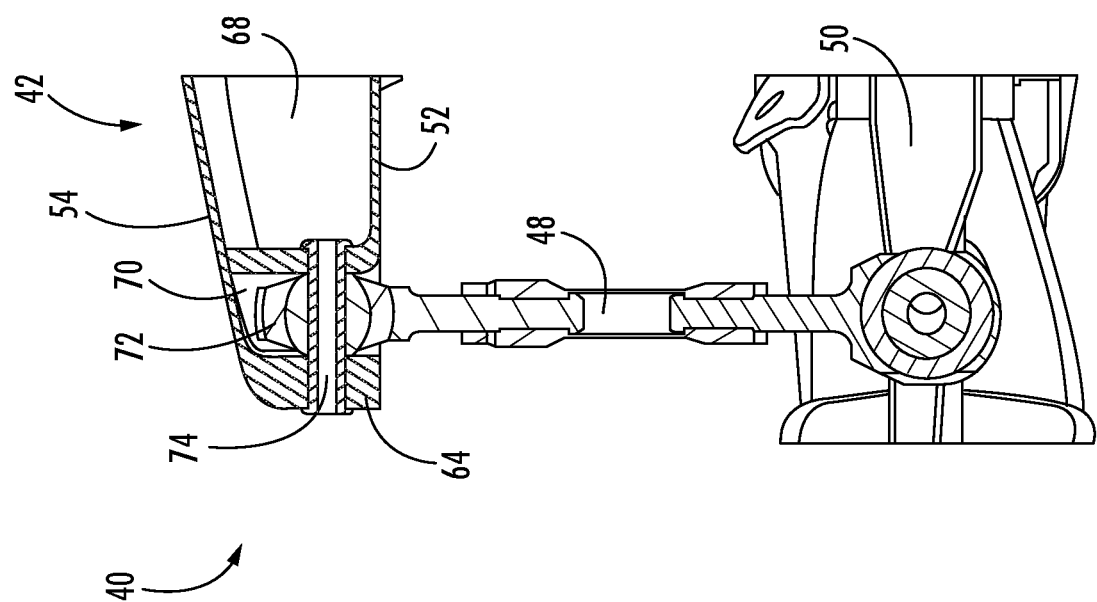
FIG. 7 is a sectional view of FIG. 6 taken along line B-B according to an embodiment.
Figure 6:
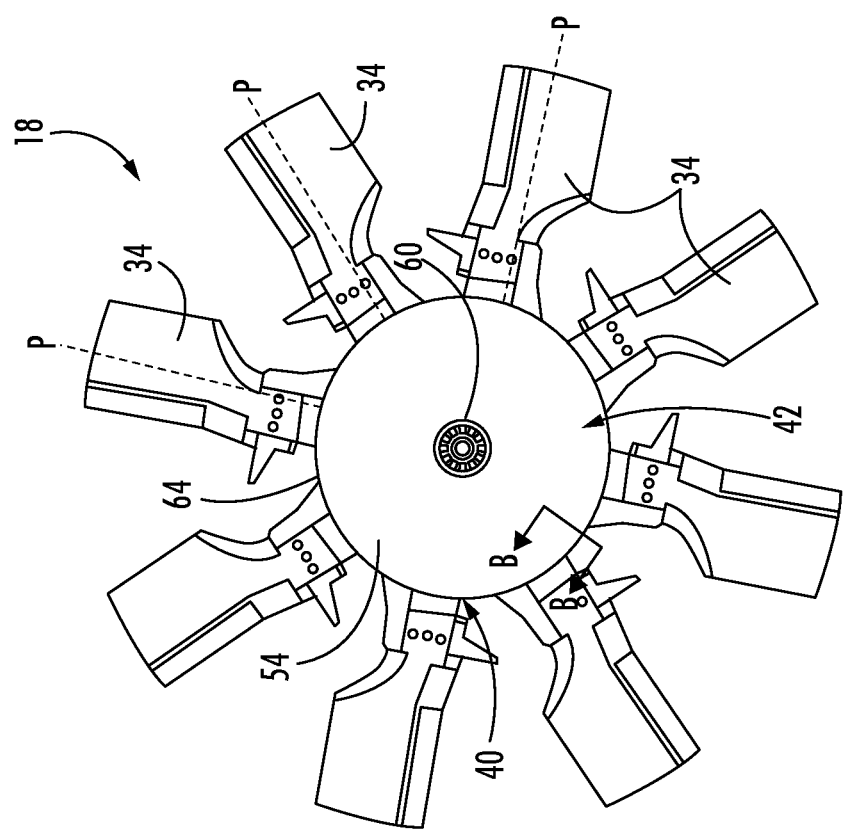
FIG. 6 is a plan view of the rotor assembly of FIG. 2 according to an embodiment.

As best shown in FIG. 7, the interior 66 of the pitch beam 42 adjacent the sidewall 64 is substantially solid. A plurality of linkage openings 70, each of which is configured to receive a first end 72 of one of the plurality of pitch linkages 48, is formed radially inwardly of the sidewall 64, within the substantially solid portion. Alternatively, the pitch beam 42 may include a single annular linkage opening 70 configured to receive the first end 72 of each of the pitch linkages 48 therein. The solidity of the material of the pitch beam 42 adjacent the at least one linkage opening 70 is configured to withstand the forces transmitted between the pitch beam 42 and the plurality of pitch linkages 48 during operation of the pitch control system 40. As shown, a fastener 74, such as a pin for example, may extend through the sidewall 64 of the pitch beam 42 and couple the first end 72 of a pitch linkage 48 thereto. A nut (not shown), such as a retaining nut for example configured to restrict movement of the fastener 74, may be arranged within the interior 66 of the pitch beam 42, such as within a hollow area 68 for example.

Although a fastener 74 is shown oriented substantially perpendicular to the rotational axis X, in other embodiments, the fasteners 74 configured to couple the pitch beam 42 to the pitch linkage 48 may extend at another angle relative to the axis of rotation X. For example, in an embodiment, the pitch beam 42 may include a rib or other feature (not shown) that would allow the fastener 74 to be oriented generally tangentially to the rotational axis X. In such embodiments, the rib or feature may be integrated into the interior or core of the pitch beam 42. Although the pitch beam 42 is illustrated and described herein with respect to a tail rotor system 18, it should be understood that the pitch beam 42 may be adapted for use with other rotor systems, including but not limited to a propulsor, or for a main rotor blade system such as the main rotor assembly 12.

A simplified pitch beam 42 as illustrated and described herein is intended to reduce the complexity, weight, and aerodynamic drag of a tail rotor system 18 having a high number of blades 34. Further, the pitch beam 42 can be configured to accommodate any number of blades 34 without significant changes to either the design or the weight of the pitch beam 42.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A pitch beam movable by a pitch change shaft to adjust a pitch of at least one rotor blade of a rotor system via a pitch linkage, the pitch beam comprising:
   a first surface having a generally planar configuration;
   a smooth second surface disposed opposite the first surface;
   a sidewall extending between the first surface and the second surface;
   a pitch linkage connection point disposed at the sidewall to which the pitch linkage is attachable;
   an interior defined between the first surface and the second surface; and
   an opening extending through the first and second surfaces and the interior at a rotational axis of the rotor system to which the pitch change shaft is attached, wherein the movement of the pitch change shaft moves the pitch beam and adjusts the pitch of the at least one rotor blade via the pitch linkage attached at the pitch linkage connection point, wherein the interior includes one or more hollow areas, the one or more hollow areas extending outwardly from a sleeve configured to mount the pitch change shaft to the pitch beam; and wherein the sidewall extends beyond the first surface such that the sidewall axially overlaps at least a portion of the pitch linkage.

2. The pitch beam of claim 1, wherein the pitch beam is formed from a composite material.

3. The pitch beam of claim 2, wherein the interior of the pitch beam includes a filler material, and the first and second surface each comprise a composite material.

4. The pitch beam of claim 1, wherein the sidewall is defined by an end portion of the second surface.

5. The pitch beam of claim 1, wherein the first surface, the second surface, and the sidewall are integrally formed.

6. The pitch beam of claim 1, wherein the second surface has a generally arcuate contour such that the pitch beam has a dome-like shape.

7. The pitch beam of claim 1, wherein the pitch linkage connection point comprises at least one linkage opening formed in the interior for receiving the pitch linkage, the at least one linkage opening being positioned adjacent the sidewall.

8. The pitch beam of claim 1, wherein the pitch beam is configured as a fairing for the rotor system.

9. A tail rotor system comprising:
a tail rotor hub rotatable about an axis;
at least one tail rotor blade extending from the tail rotor hub; and
a pitch control system including:
a pitch change shaft extending from the tail rotor hub, the pitch change shaft extending along the axis, the pitch change shaft being translatable along the axis relative to the tail rotor hub;
a pitch beam disposed at a distal end of the pitch change shaft and coupled to the at least one tail rotor blade, the pitch beam being movable to adjust a pitch of the at least one tail rotor blade, wherein an outwardly facing surface of the pitch beam facing away from the at least one tail rotor blade is a smooth surface; and
at least one pitch linkage, the at least one pitch linkage being attachable to the pitch beam;
wherein the pitch beam includes one or more hollow areas defined with an interior of the pitch beam, the one or more hollow areas extending outwardly from a sleeve configured to mount the pitch change shaft to the pitch beam;

wherein the pitch beam includes a first surface disposed opposite the outwardly facing surface and a sidewall extending between the first surface and the outwardly facing surface, and wherein the pitch control system further includes a fastener extending through the sidewall, the fastener being configured to couple an end of the pitch linkage to the sidewall.

10. The tail rotor system of claim 9, wherein the tail rotor system is arranged at a side of an extending tail of an aircraft.

11. The tail rotor system of claim 9, wherein the tail rotor system is a propulsor of an aircraft.

12. The tail rotor system of claim 9, wherein the pitch beam further comprises:
a pitch linkage connection point disposed at the sidewall to which the at least one pitch linkage is attachable; and
an opening extending through the first surface and the outwardly facing surface and the interior at a rotational axis of the rotor system to which the pitch change shaft is attached, wherein the movement of the pitch change shaft moves the pitch beam and adjusts the pitch of the at least one rotor blade via the at least one pitch linkage attached at the pitch linkage connection point;
wherein the first surface has a generally planar configuration and the interior is defined between the first surface and the outwardly facing surface.

13. The tail rotor system of claim 12, wherein the interior of the pitch beam includes a filler material, and the first surface and the outwardly facing surface each comprise a composite material.

14. The tail rotor system of claim 9, wherein the outwardly facing surface of the pitch beam has a generally arcuate contour such that the pitch beam has a dome-like shape.

15. The tail rotor system of claim 12, wherein:
the first surface faces the at least one tail rotor blade.

16. The tail rotor system of claim 15, wherein the pitch beam further comprises at least one linkage opening formed in the interior, the at least one pitch linkage being associated with the at least one tail rotor blade, wherein a first end of the at least one pitch linkage is receivable within the at least one linkage opening.

17. The tail rotor system of claim 16, wherein the at least one linkage opening is positioned adjacent the sidewall.

18. The tail rotor system of claim 9, wherein the pitch beam is configured as a fairing for the tail rotor system.

19. The tail rotor system of claim 9, wherein the sidewall is integrally formed with at least one of the first surface or the outwardly facing surface.

* * * * *